United States Patent [19]
Holloway

[11] Patent Number: 5,016,940
[45] Date of Patent: May 21, 1991

[54] SEAT RECLINING MECHANISM

[75] Inventor: Ian Holloway, Stratford-Upon-Avon, United Kingdom

[73] Assignee: I.H.W. Engineering Ltd., United Kingdom

[21] Appl. No.: 319,258

[22] Filed: Mar. 3, 1989

[30] Foreign Application Priority Data

Mar. 5, 1988 [GB] United Kingdom ............... 8805290

[51] Int. Cl.⁵ ............................................. B60N 1/02
[52] U.S. Cl. .................................. 297/362; 297/355; 475/162
[58] Field of Search ............... 292/362, 363, 364, 365, 292/361, 355; 74/804, 805, 801; 475/162, 92

[56] References Cited

U.S. PATENT DOCUMENTS

| | | | |
|---|---|---|---|
| 3,260,135 | 7/1966 | Eisenhardt | 74/804 X |
| 3,602,070 | 8/1971 | Verge | 74/804 |
| 4,025,109 | 5/1977 | Klingelhofer et al. | 297/362 X |
| 4,143,905 | 3/1979 | Hensel et al. | 297/361 X |
| 4,345,792 | 8/1982 | Shephard | |
| 4,453,767 | 6/1984 | Walk et al. | 297/362 |
| 4,656,891 | 4/1987 | Durand | 74/804 |
| 4,708,392 | 11/1987 | Werner et al. | 297/362 |
| 4,733,579 | 3/1988 | Lew | 74/804 |
| 4,770,464 | 9/1988 | Pipon et al. | 297/363 X |

FOREIGN PATENT DOCUMENTS

| | | | |
|---|---|---|---|
| 0084197 | 12/1982 | European Pat. Off. | |
| 1116080 | 10/1961 | Fed. Rep. of Germany | 297/363 |
| 3201309 | 7/1983 | Fed. Rep. of Germany | |
| 8705554.6 | 4/1987 | Fed. Rep. of Germany | |
| 7633633 | 11/1976 | France | |
| 314023 | 11/1971 | U.S.S.R. | 74/804 |
| 923508 | 4/1963 | United Kingdom | 74/804 |
| 1002810 | 9/1965 | United Kingdom | 297/361 |

*Primary Examiner*—Jose V. Chen
*Attorney, Agent, or Firm*—Jones, Askew & Lunsford

[57] ABSTRACT

A seat reclining mechanism including a cushion arm pivotally connected to a squab arm by a planetary gear arrangement, the planetary gear arrangement including a pair of side by side ring gears, one of the ring gears being secured to the squab arm and the other of the ring gears being secured to the cushion arm, a sun and planetary gear arrangement common to both ring gears, the sun and planetary gear arrangement including radially movable planetary gears surrounding at least one sun gear having a fruso-conical form which is biased in an axial direction so as to urge the planetary gears in a radially outwards direction and into contact with the ring gears.

8 Claims, 3 Drawing Sheets

SEAT RECLINING MECHANISM

The present invention relates to a seat reclining mechanism.

In our U.K. Patents 1528357 and 1586869 we disclose a seat reclining mechanism which includes a cushion arm pivotally connected to a squab arm by a planetary gear arrangement. The planetary gear arrangement includes a pair of side by side ring gears, one being secured to the squab arm and the other being secured to the cushion arm. A sun gear is provided which is in driving connection with both ring gears via a plurality of planet gears. The pitch of teeth in each of the ring gears is different so that rotation of the planet gears causes relative rotation between the ring gears.

The planet gears float and it is necessary for there to be an acceptable amount of tolerance between the gears in order to enable smooth operation. Unfortunately such tolerance also results in pivotal play between the squab and cushion arms.

In accordance with one aspect of the present invention such play is substantially reduced or eliminated by incorporating at least one sun gear having a frusto-conical form, the sun gear being biased in an axial direction so as to urge the planetary gears in a radially outwards direction and into contact with the ring gears. Accordingly pivotal play between the squab arm and cushion arm is substantially reduced or eliminated.

Preferably a pair of sun gears are provided, both of which are substantially of frusto-conical form, the pair of sun gears being arranged with their smaller diameter axial ends facing one another and such that they are located on opposite axial sides of the planetary gears. The biasing means are arranged such as to urge the two sun gears axially toward one another. This may be achieved by having one sun gear axially fixed and the other axially movable or both sun gears may be axially movable.

Preferably three planetary gears are provided which are equally spaced about the internal circumference of the ring gears. Three planetary gears are preferred since such an arrangement ensures that each sun gear will apply an equal radial loading on each planetary gear. However it is to be appreciated that more than three planetary gears may be provided if necessary.

The mechanism may also include at least one support member for the planetary gears of the type disclosed in our U.K. patent 1586869. Thus the support member would include for each planetary gear a concave surface. The support member ensures that the planetary gears maintain their circumferential spacing and also restrict radially inward movement of each planetary gear.

Preferably the included angle between the inclined peripheral face of each sun gear and its axis is small, for example in the range 2° to 15°.

Preferably, the sun and planetary gears have involute teeth. This facilitates smooth operation of the mechanism.

Various aspects of the present invention are hereinafter described with reference to the accompanying drawings, in which.

Figure 1:
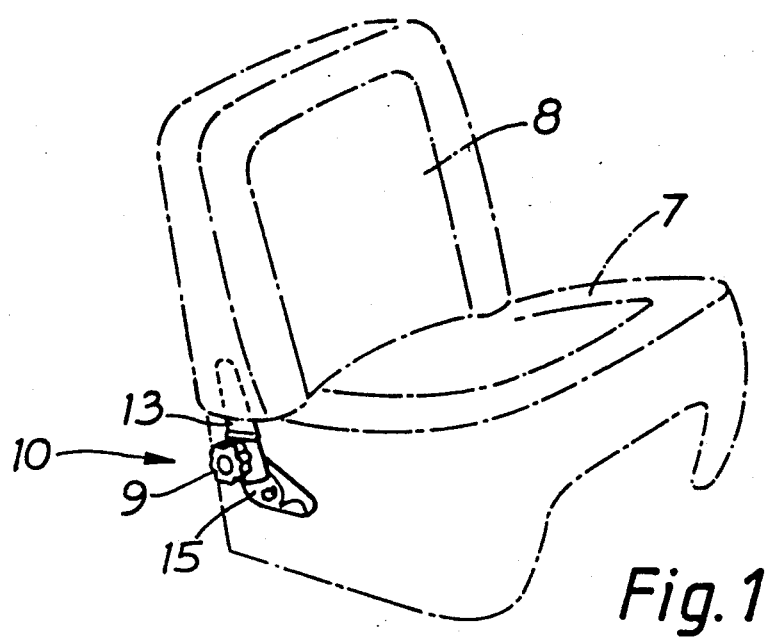
FIG. 1 is a schematic perspective view of a vehicle seat including a seat reclining mechanism according to the present invention.

The seat reclining mechanism 10 of the present invention is used to pivotally connect a seat back or squab 8 to a seat cushion 7. Two mechanisms 10 are used per seat, one being located on either side of the seat (only one of which is visible in FIG. 1) and each mechanism 10 includes a squab arm 13 secured to the frame (not shown) of the squab and a cushion arm 15 secured to the frame (not shown) of the cushion. The mechanisms are both driven by a handle 9.

Figure 3:
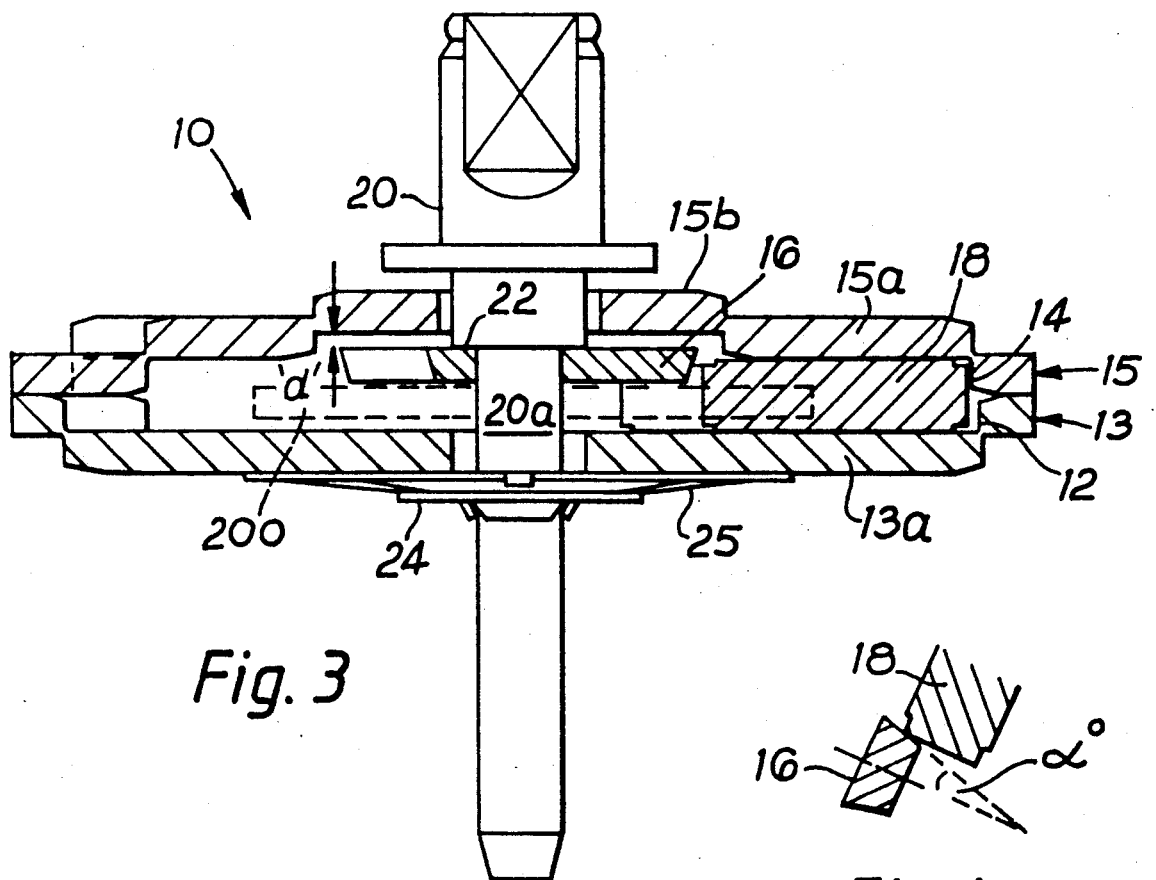
FIG. 3 is a more detailed sectional view taken along line X—X in FIG. 2.
Figure 4:
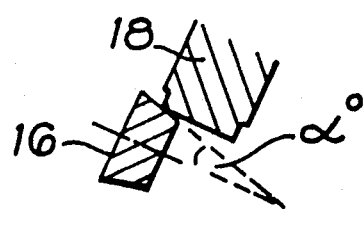
FIG. 4 is a part sectional view taken along line Y—Y in FIG. 2.
Figure 2:
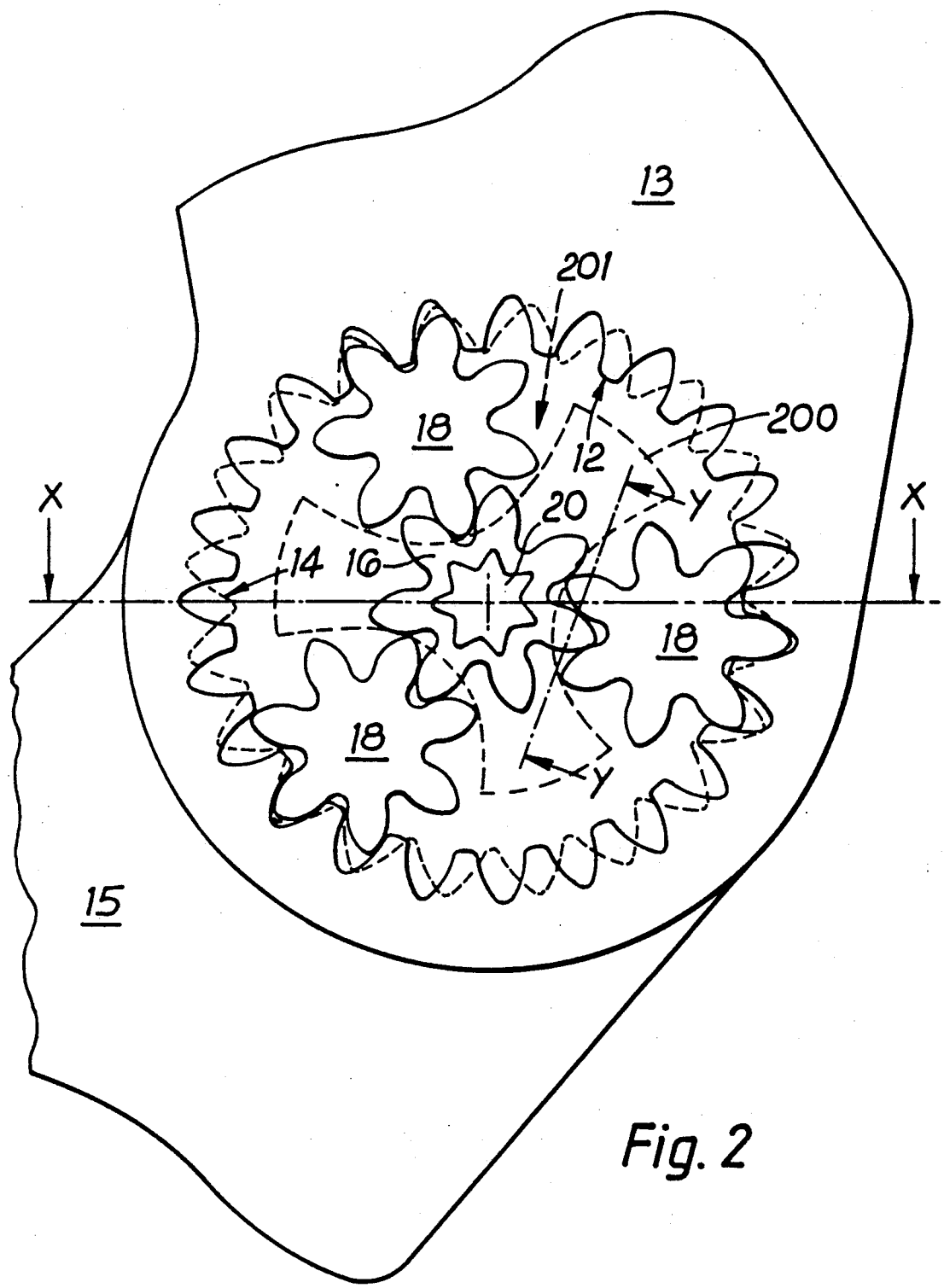
FIG. 2 is a schematic end view of a seat reclining mechanism according to the present invention.

In the embodiment illustrated in FIGS. 2 to 4 of the drawings, the mechanism includes a first ring gear 12 which forms part of the squab arm 13 (only part of which is visible in FIG. 2) and a second ring gear 14 which forms part of a cushion arm 15 (only part of which is visible in FIG. 2). The squab and cushion arms are more fully illustrated in our U.K. patents 1528357 and 1586869.

The squap and cushion arms are preferably formed from metal plate and the ring gears 12, 14 are preferably formed by a pressing operation. The pressing operation provides offset wall portions 13a, 15a which together with the internal walls of the ring gears define a housing for the sun and planetary gears 16 and 18 respectively.

As seen in FIG. 2, three planetary gears 18 are provided which are equi-spaced about the internal circumference of the ring gears 12, 14.

As seen in FIG. 3, the sun gear 16 is mounted on a drive shaft 20 and is located so as to be slightly offset to one axial side of the planetary gears 18.

The sun gear 16 is located on the drive shaft 20 so as to be rotatable therewith and bears against a shoulder 22. The shaft 20 projects through wall portion 13a to receive a washer 24. A spring 25 is located between the washer 24 and wall portion 13a to urge the shaft 20 in an axial direction so as to urge the sun gear 16 further inbetween the planetary gears 18.

As seen in FIGS. 3 and 4 the sun 16 is of generally frusto-conical shape with its narrow end facing the direction of bias caused by spring 25. Thus as the sun gear 16 is urged further inbetween the planetary gears it has the effect of urging the planetary gears radially outward and into urged contact with the ring gears 12, 14. The angle of inclination of the peripheral wall of the sun gear 16 is preferably about 5° to 10°.

The strength of the spring 25 is chosen to ensure that the biasing force is greater than the force generated by rotating the drive shaft during adjustment and which tends to urge the gear axially out of engagement with the planetary gears. This ensures that the planetary gears are urged radially outwardly during adjustment of the mechanism as well as when the mechanism is static.

It is envisaged that the edges of the planetary gears 18 may be chamfered slightly to assist axial entry of the sun gear 16 without interfering with the rolling action of the gears.

It will be seen in FIG. 2 that the gear profiles are involute. This provides for smooth operation of the mechanism since the planetary gears and ring gears are maintained in rolling contact. If desired however the gear profiles adopted in our U.K. patent 1528357 and 1586869 may be used.

Figure 5:
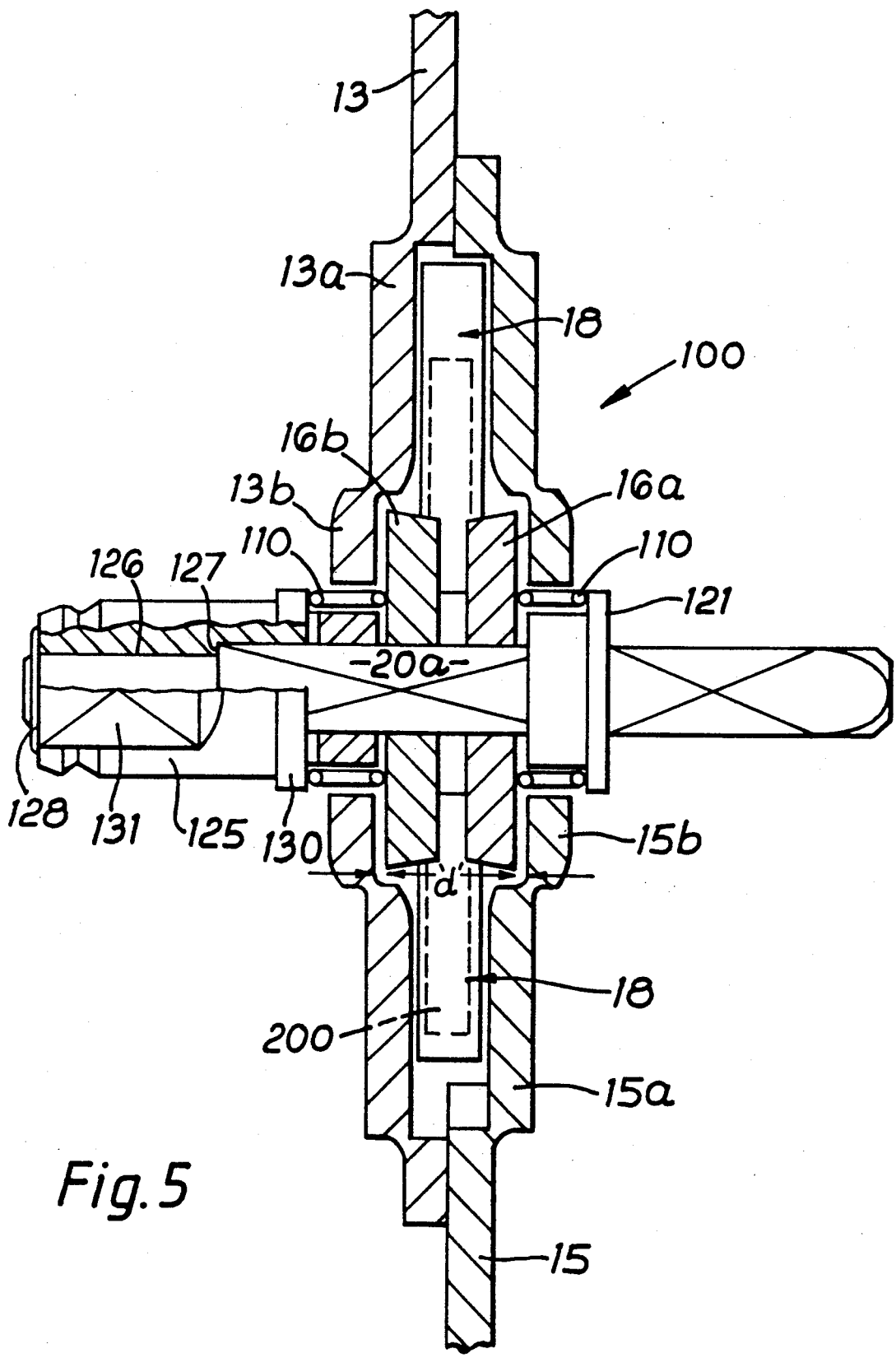
FIG. 5 is a view similar to FIG. 3 of an alternative embodiment according to the present invention.

In FIG. 5 there is illustrated an alternative embodiment 100 in which 2 sun gears 16a, 16b are provided. Embodiment 100 is a modification of the embodiment 10 and similar parts have been designated by the same reference numerals. In the embodiment of FIG. 5 both sun gears 16a, 16b are slidably mounted on the drive shaft 20 and are urged axially toward one another by associated coiled springs 110. As for the spring 25, the strength of springs 110 are chosen to provide a biasing force greater than the force tending to urge the gears out of axial engagement which is generated by rotating the drive shaft.

The drive shaft 20 includes a main portion 20a which extends through and projects either side of the hinge assembly. The main portion 20a is preferably fluted to define in cross-section a star shape (see FIG. 2). At one side of the hinge assembly the main portion 20a is provided with a shoulder 121 which is preferably formed integrally with the main portion 20a. A coil spring 110 is compressed between the shoulder 121 and sun gear 16a. This has the effect of biasing sun gear 16a in an axial direction toward sun gear 16b.

At the opposite side of the hinge assembly the main portion 20a is provided with a boss 125. The boss 125 includes an internal bore 126 which has a portion having a cross sectional shape complementary with the main portion 20a and so is rotatable in unison therewith. The boss 125 is provided with a shoulder 127 which prevents axial movement toward the sun gear 16b and is prevented from being axially withdrawn from the shaft portion 20a by means of a clip 128 secured to the main shaft portion 20a.

The boss 125 includes a shoulder 130 and a coiled spring 110 is compressed between shoulder 130 and sun gear 16b. This has the effect of biasing the sun gear 16b in an axial direction toward sun gear 16a. The boss 125 includes an external flat 131 and serves as a support for connection of the handle 9 for effecting rotation of the drive shaft 20.

Each sun gear 16a, 16b has a central bore having a cross-sectional shape complementary with the cross-sectional shape of the shaft position 20a which enables each sun gear to slide axially along the main shaft portion 20a and yet be rotationally fixed relative thereto. Preferably the star shape of the main shaft portion 20a and sun gear bore is chosen to have the same number of star arms as the number of teeth as the sun gear, the star arms being being radially aligned with the teeth. This facilitates ensuring that both sun gears 16a, 16b are correctly aligned during assembly of the mechanism.

However it will be appreciated that other crosssectional shapes of the main shaft 20a may be adopted if desired, such as for example a polygonal shape.

Preferably the off-set wall portions 13a, 15a are provided with further off-set portions 13b, 15b which are designed to be spaced from gears 16a, 16b by a limited distance 'd' which is chosen to limit axial outward movement of sun gears 16a, 16b so as to ensure that meshing engagement between the sun and planetary gears is maintained in the event of one or both springs 110 failing. Similarly in the embodiment of FIG. 2, sun gear 16 is spaced from a further wall portion 15b to maintain meshing engagement with the planetary gears in the event of failure of spring 25.

If desired a support member 200 (shown in broken lines in FIGS. 2, 3 and 5) may be included. The support member has concave depressions 201 in each of which a planetary gear is seated. The depressions 201 in the support member 200 serve to restrain radial inward movement of the planetary gears.

As illustrated in the drawings, three planetary gears 18 are preferred. This is because three is the minimum number of gears which can be acted upon by the sun gear(s) to ensure that the sun gear(s) apply an equal load to all planetary gears irrespective of the concentricity of the ring gears 12, 14 and/or the circularity of each ring gear 12, 14.

If a larger number of equally spaced planetary gears 18 are to be used, preferably the number is chosen such that no two gears are diametrically opposed ie an odd number of gears is chosen.

In the embodiment described above and illustrated in the drawings, the pivotal movement between the squab and cushion arms is defined and supported by the gear system, ie by the intermeshing of the sun, planetary and ring gears and there is no separate journal for supporting the pivotal movement. It will be appreciate however that the squab and cushion arms could be pivotally corrected by journal formations and that the sun, planetary and ring gears be utilised to cause relative rotation about the pivot only.

I claim:

1. A seat reclining mechanism including a cushion arm pivotally connected to a squab arm by a planetary gear arrangement, the planetary gear arrangement including a pair of side by side ring gears, one of the ring gears being secured to the squab arm and the other of the ring gears being secured to the cushion arm, a sun and planetary gear arrangement common to both ring gears, the sun and planetary gear arrangement including radially moving planetary gears surrounding at least one sun gear having a frusto-conical form which is biased in an axial direction so as to urge the planetary gears in a radially outwards direction and into contact with the ring gears.

2. A seat reclining mechanism according to claim 1 wherein three planetary gears are provided.

3. A seat reclining mechanism according to claim 1 wherein support means are provided for supporting the planetary gears against radial inward movement.

4. A seat reclining mechanism according to claim 1 wherein the included angle between the inclined peripheral face of each sun gear and its axis is preferably in the range of 2° to 15°.

5. A seat reclining mechanism according to claim 1 wherein the sun and planetary gears have involute teeth.

6. A seat reclining mechanism according to claim 1 wherein the peripheral edges of the planetary gears are chamfered.

7. A seat reclining mechanism including a cushion arm pivotally connected to a squab arm by a planetary gear arrangement, the planetary gear arrangement including a pair of side by side ring gears, one of the ring gears being secured to the squab arm and the other of the ring gears being secured to the cushion arm, a sun and planetary gear arrangement common to both ring gears, the sun and planetary gear arrangement including radially moving planetary gears surrounding a pair of sun gear having a frusto-conical form which is biased in an axial direction so as to urge the planetary gears in a radially outwards direction and into contact with the ring gears, the sun gears being of frusto-conical form, the pair of sun gears being arranged with their smaller diameter axial ends facing one another such that they are located on opposite axial sides of the planetary gears, and biasing means being provided to urge the two sun gears axially toward one another.

8. A seat reclining mechanism according to claim 7 wherein both sun gears are axially movable.

* * * * *